(12) United States Patent
Pham et al.

(10) Patent No.: US 11,524,381 B2
(45) Date of Patent: Dec. 13, 2022

(54) MACHINING CENTRE FOR TIMEPIECE COMPONENTS

(71) Applicant: ETA SA Manufacture Horlogere Suisse, Grenchen (CH)

(72) Inventors: Patric Pham, Utzenstorf (CH); Pierre-Andre Buehler, Orvin (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 427 days.

(21) Appl. No.: 16/543,805

(22) Filed: Aug. 19, 2019

(65) Prior Publication Data
US 2020/0086447 A1 Mar. 19, 2020

(30) Foreign Application Priority Data
Sep. 19, 2018 (EP) ..................................... 18195543

(51) Int. Cl.
*B23Q 39/04* (2006.01)
*G04D 3/00* (2006.01)

(52) U.S. Cl.
CPC ......... *B23Q 39/044* (2013.01); *B23Q 39/046* (2013.01); *B23Q 39/048* (2013.01);
(Continued)

(58) Field of Classification Search
CPC .... B23Q 39/04; B23Q 39/042; B23Q 39/044; B23Q 39/046; B23Q 2039/004;
(Continued)

(56) References Cited

U.S. PATENT DOCUMENTS 1,360,175 A * 11/1920 Bullard, Jr. .......... B23Q 39/044
29/38 A
1,508,974 A * 9/1924 Jackson ............... B23Q 39/042
470/904
(Continued)

FOREIGN PATENT DOCUMENTS

CH 706 794 B1 2/2014
CN 1648792 A 8/2005
(Continued)

OTHER PUBLICATIONS

European Search Report dated Feb. 11, 2019 in European Application 18195543.6 filed Sep. 19, 2018 (with English Translation of Categories of Cited Documents).
(Continued)

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A machining centre includes a base supporting several superposed stages. At least one stage is movable and can be position indexed relative to the base. Each stage includes distinct stations at a constant angular pitch including machining units or grippers. The combination of stations from adjacent stages defines a plurality of machining locations each combining a unit and a gripper. Each relative movement between two indexing positions of two stages changes the composition of the locations. Each gripper has at least one rotational degree of freedom relative to the stage that carries it. At least one station includes both at least one machining unit and at least one gripper.

21 Claims, 7 Drawing Sheets

(52) U.S. Cl.
CPC .......... *G04D 3/0002* (2013.01); *Y10T 29/519* (2015.01); *Y10T 29/5125* (2015.01); *Y10T 29/5128* (2015.01)

(58) Field of Classification Search
CPC ........ B23Q 2039/006; B23Q 2039/008; Y10T 29/5125; Y10T 29/5126; Y10T 29/5127; Y10T 29/5128; Y10T 29/5129; Y10T 29/512; Y10T 29/519; Y10T 409/305824; Y10T 409/308232
USPC ........ 29/33 J, 37 R, 37 A, 38 R, 38 A, 38 B, 29/38 C; 409/168, 211
See application file for complete search history.

(56) References Cited

U.S. PATENT DOCUMENTS

| | | | | |
|---|---|---|---|---|
| 1,804,971 A * | 5/1931 | Bullard, Jr. | .......... | B23Q 39/042 82/122 |
| 1,911,303 A * | 5/1933 | Brown, Jr. | .......... | B23Q 39/044 408/34 |
| 1,967,689 A * | 7/1934 | Schauer | .......... | B23Q 39/042 74/820 |
| 2,182,799 A * | 12/1939 | Farr | .......... | B23P 23/04 29/283 |
| 2,358,389 A * | 9/1944 | Ewart | .......... | B23Q 16/028 74/820 |
| 2,628,413 A * | 2/1953 | Hallenbeck | .......... | B23Q 16/065 318/362 |
| 3,203,316 A * | 8/1965 | Cashman | .......... | B23Q 39/042 82/122 |
| 3,792,633 A * | 2/1974 | Filipiev | .......... | B23Q 39/04 82/122 |
| 4,642,861 A * | 2/1987 | Riley | .......... | B23Q 1/621 82/122 |
| 4,862,569 A * | 9/1989 | Buzzi | .......... | B23P 21/006 29/53 |
| 9,700,975 B2 * | 7/2017 | Kelkar | .......... | B23Q 1/015 |
| 2011/0106291 A1 | 5/2011 | Matsumoto | | |
| 2015/0239081 A1 | 8/2015 | Niidoi et al. | | |
| 2016/0346888 A1 | 12/2016 | Huber et al. | | |
| 2017/0008108 A1 | 1/2017 | Wuerfel | | |

FOREIGN PATENT DOCUMENTS

| | | |
|---|---|---|
| CN | 101287571 A | 10/2008 |
| CN | 201464830 U | 5/2010 |
| CN | 107193203 A | 9/2017 |
| EP | 2 306 253 A1 | 4/2011 |
| EP | 2 306 253 B1 | 4/2011 |
| JP | 56-82149 A | 7/1981 |
| JP | 5-147062 A | 6/1993 |
| JP | 2002-160133 A | 6/2002 |
| JP | 2004-174627 A | 6/2004 |
| JP | 2006-43824 A | 2/2006 |
| JP | 2011-156619 A | 8/2011 |
| JP | 2014-83633 A | 5/2014 |
| JP | 2014-133299 A | 7/2014 |
| JP | 2015-147285 A | 8/2015 |
| JP | 2017-505210 A | 2/2017 |
| JP | 2017-52084 A | 3/2017 |
| WO | WO 2010/004960 A1 | 1/2010 |
| WO | WO 2017/054130 A1 | 4/2017 |
| WO | WO 2017/182839 A1 | 10/2017 |

OTHER PUBLICATIONS

Combined Chinese Office Action and Search Report dated Jan. 27, 2021 in corresponding Chinese Patent Application No. 201910885132.X (with English Translation of Category of Cited Documents), 6 pages.
Japanese Office Action dated Oct. 27, 2020 in Japanese Patent Application No. 2019-157717 (with English Translation), 33 pages.

* cited by examiner

MACHINING CENTRE FOR TIMEPIECE COMPONENTS

CROSS-REFERENCE TO RELATED APPLICATION

The present application claims priority to European Patent Application No. 18195543.6, filed on Sep. 19, 2018, the entire content and disclosure of which are incorporated by reference herein.

FIELD OF THE INVENTION

The invention concerns a machining centre for timepiece components in medium-sized production runs, including a fixed base, on which are coaxially superposed several stages, at least one of which is movable relative to said fixed base, and wherein each said stage which is movable relative to said fixed base can be position indexed with respect to said fixed base, each said stage including, on its periphery, a plurality of distinct stations arranged at a constant angular pitch, said stations including machining units and/or grippers whose movements are controlled by control means, said machining centre including a plurality of machining locations each formed by a combination of said stations from two adjacent said stages, each said machining location combining, on the one hand, at least one said machining unit of a said station of one of said adjacent stages, and on the other hand, at least one gripper of another said station of the other of said adjacent stages, and wherein each relative movement between two indexing positions of two said stages is able to change the composition of each of said machining locations, said machining centre including, among said stages, at least a first stage and a second stage which are superposed and adjacent, wherein at least one of said first stage and second stage is movable relative to said fixed base, said first stage and said second stage being arranged such that, in any relative indexing position of said first stage with respect to said second stage, each said machining location formed in this indexing operation includes at least one said machining unit belonging to one of said adjacent first stage and second stage, and at least one said gripper belonging to the other of said adjacent first stage and second stage.

The invention concerns the field of machine tools for the fabrication of timepiece components.

BACKGROUND OF THE INVENTION

The context of watch production has changed: the very large production runs have disappeared, and production runs are now medium-sized or small. Consequently, large transfer machines with ten to forty units are too restrictive in terms of start-up, compared to small or medium batch sizes, since the start-up time is too great relative to the cycle times, and such machines do not allow for the flexibility demanded by the markets, which require increased customization of watches, as well as rapid availability of new products.

Moreover, the traditional separation between tool machining and abrasion machining lengthens the production cycle and increases preparation time.

US Patent Application No. 2016/346888 A in the name of HUBER/DMU DENTAL discloses a machining device for machining dental workpieces, in particular artificial teeth and/or other dental replacement parts, at least one workpiece to be machined being clamped in a workpiece retainer device able to be driven in translation and rotation, about a rotational axis, and arranged to feed the workpiece, for machining, to at least one tool spindle that is rotationally driven and to which a tool is secured, an additional device carries a plurality of tools on a first side of the workpiece retainer device, and a workpiece changer receiving the parts to be machined, for replacement thereof, is arranged on the other side of workpiece retainer device.

EP Patent Application No. 2017/182839 A1 in the name of METOTECNA SAGL discloses a transfer machine for machining operations, comprising a frame, a rotary table with a rotary feed movement relative to a machine axis, a plurality of workpiece-holder members associated with the rotary table and spaced by a given working radius from said machine axis, a plurality of work stations accessible by the workpiece-holder members as a result of the feeding movement of the table, at least one rotary unit able to rotate a workpiece-holder member about a respective axis and relative to the table, wherein this rotary unit includes a motor assembly located in the machine base, at a distance from the machine axis which is less than the working radius.

EP Patent Application No. 2306253A1 in the name of CITIZEN Machinery Co Ltd discloses an interference check device arranged to easily perform an interference check of a movable body, when a plurality of moving means cooperate to move the movable body. This interference check device is arranged in an apparatus provided with one or more movable bodies capable of moving in a predetermined direction, and moving means for moving the movable body or bodies, and includes a plurality of moving means for moving at least one of the moving bodies, and performs an interference check as the moving body moves. This interference check includes an absolute movement amount calculating part, which synthesizes the amount of movement of the moving body in the same direction by the plurality of moving means, to thus determine the amount of absolute movement in the direction, and includes an interference check part which is provided in association with this absolute quantity calculating part, and performs the interference check from the absolute movement amount.

CH Patent No. 706794B1 in the name of BUMOTEC discloses a machining unit which includes two spindles and tools for processing one side of at least one workpiece held on a table by a workpiece retainer, with the use of at least one tool magazine. The work table is a cross-moving table, which is movable horizontally in a first direction on a first transverse path and in a second direction on another transverse path. The work spindles are adjustable vertically in a direction perpendicular to these first and second directions, independently of one another. The vertical axes of rotation of the spindles are separated horizontally from each other by a certain distance in a first direction, equal to or less than half the travel of the crossed table in the first direction.

SUMMARY OF THE INVENTION

The invention proposes to implement a versatile machine-tool, suitable for making very varied timepiece components, which is easier to implement than prior art machines, and in particular having reduced adjustment times and offering short cycle times.

To this end, the invention concerns a machining centre according to claim 1.

BRIEF DESCRIPTION OF THE DRAWINGS

Other features and advantages of the invention will appear upon reading the following detailed description, with reference to the annexed drawings, in which:

FIG. 1 represents a schematic, perspective view of a machining centre according to the invention, including, above a fixed base, a first fixed stage in the upper part, comprising machining units on three of its four upper lateral stations, two of which are visible, and, between the base and the first stage, a second stage rotatable about a vertical axis, including four lower lateral stations, each equipped here with a rotary or double rotary gripper; a first machining location and a second machining location having different arrangements, are visible in this Figure; this machining centre is in an instantaneous position in which a first upper station of the first stage lies above a first lower station, and so on; during the machining cycle, the other lower stations will then pass, in succession, underneath the first upper station, and in the same manner the cooperations are incremented one step on each rotation of the second lower stage.

FIG. 3 represents a schematic, top view of the machining centre of FIG. 1 and at the same moment as FIG. 1, in the same relative position of the first upper stage and the second lower stage; in this particular and non-limiting configuration, the first upper stage has only three upper stations occupied by machining units: the first and the second upper stations visible in FIG. 1 and a third upper station on the opposite side to the first station, and which includes two oblique tool turrets; the fourth upper station, opposite the second station, does not have a machining unit, to allow insertion of a manipulator to check and/or exchange a workpiece in the gripper spindle of the second lower stage which is the only one visible underneath this fourth upper station; an external feed area visible in the right part of the Figure allows workpieces and/or tools to be exchanged with the machine area.

DETAILED DESCRIPTION OF PREFERRED EMBODIMENTS

The invention concerns a machining centre 100 for timepiece components in medium-sized production runs.

This machining centre includes a fixed base 60, on which several stages 10 are superposed, substantially coaxially.

At least one of these stages is movable relative to fixed base 60, as in most transfer machines.

Each stage 10, which is movable relative to fixed base 60, can be position indexed relative to this fixed base 60, especially angularly.

Each stage 10 includes, on its periphery, a plurality of distinct stations 50, which are disposed at a constant angular pitch. For example, stage 10 has facets on which the various stations are arranged: four stations on a cube or suchlike, six stations on a hexagonal prism, or otherwise. More particularly, each station extends in a substantially planar manner on a plane defining two linear axes. More particularly still, this plane is substantially vertical or vertical. There are also known turret mechanisms, which appeared in the first machining centres in the 1960s and 1970s, which, however, limit the possible travel of the units that they carry, whereas a structure with planar facets allows practically all degrees of freedom, and makes it easy to design machining means with four, five or more axes.

Although, in practice, it is known to make machining centres with six to eight axes, the problem of collision management very quickly arises, which must take into account the movement on each axis and the size of the workpieces being machined and the tools. Moreover, it is difficult to ensure effective lubrication of the cutting area.

It is noted that, if stations 50 are arranged on each stage with a constant pitch, this pitch is not necessarily the same from one stage to another. It may, in particular, be a multiple, sub-multiple or otherwise. The invention is illustrated here in the particular and non-limiting case of equal angular pitches on the various stages.

The invention is illustrated here in the non-limiting case of five-axis machining processes; it is clear that there is no design limitation on the number of axes, except as regards the wire, hydraulic and pneumatic harnesses, which impose limitations because of the angular and linear strokes.

These stations 50 include machining units 3 and/or grippers 4, whose movements are controlled by control means 90 comprised in machining centre 100 for controlling all the shaft movements and motors, spindle motors, tool changer, dressing and other systems, tool life, tool and workpiece measuring systems, force measuring means, anti-collision systems, handling means, especially the workpiece changers and any pallets, the lubricating means, and all the conventional machine tool accessories.

A gripper 4 is arranged to hold at least one component to be machined and/or to be checked while it is machined and or checked, either directly or via at least one support stand.

Machining centre 100 includes a plurality of machining locations 2. As seen in FIGS. 13 to 16, each machining location 2 is in fact a non-permanent configuration, which results from a relative positioning of various stations 50 which face one another for a limited duration, which must allow the longest machining operation to be performed on machining centre 100, and which allows a particular type of machining to be performed in relation to a particular support stand.

It will be noted that the term 'machining' is to be interpreted widely, since it can include operations other than the conventional cutting and abrasion operations, and in particular laser machining or welding, bonding, crimping, or otherwise.

Each machining location 2 is thus formed by the temporary combination of stations 50, 51, 52, 53, 54, 501, 502, 503, 504 of two adjacent stages 10. The movement of a movable, especially rotatable stage 10, can thus change the relative positioning of the stations present, and substitutes, in the same geometric location in space, another machining location 2 for the preceding one.

Depending on the type of production to be effected, the relative movement of the stages can either substitute one machining location 2 in a particular composition for another machining location having the same composition, or substitute it for a machining location with a different composition, machining location 2 thus has a variable composition: at least one relative movement between two indexing positions of two stages 10 can then change the composition of each of machining locations 2 to obtain at least two distinct compositions of these machining locations 2. Naturally, it is possible to arrange machining centre 100 so that these two machining location composition modes are mixed, to obtain, in the same production cycle, certain machining locations that are identical to each other, and others that are different.

A 'cycle' means here the path of a product to be machined at several successive machining locations 2, obtained by rotating at least one stage 10 relative to base 60. Depending on the work to be performed, the complete machining process may require this product to travel to all, or only part of every possible machining location 2. Certain machining locations 2 may be identically duplicated, in order to balance the transit time in each angular position with the lowest possible duration.

Of course, the product being machined, assembled on a support stand of gripper 4, or on the actual gripper 4, is not necessarily a single component: there may be an array of components. This array may comprise several identical components for the same operation, or several identical components but for different operations in the same machining location, such as double-sided machining processes, or different components, the objective being to make the production of the machining centre profitable, while balancing the machining time at each work location 2. More particularly, each workpiece to be machined is loaded/pushed into a clamp, and all on a mandrel which fits into the spindle.

Each machining location 2 combines, on the one hand, at least one machining unit 3 of a station 50 of one of these adjacent stages 10, and on the other hand, at least one gripper 4 of another station 50 of the other of the adjacent stages 10.

And each relative movement between two indexing positions of two stages 10 changes the composition of each of the machining locations 2.

This machining centre 100 includes, among stages 10, at least a first stage 30 and a second stage 40 which are superposed and adjacent, wherein at least one of first stage 30 and second stage 40 is movable relative to fixed base 60. First stage 30 and second stage 40 are arranged such that, in any relative indexing position of first stage 30 with respect to second stage 40, each machining location 2 formed in this indexing operation includes at least one machining unit 3 belonging to one of these two adjacent stages 30 and 40, and includes at least one gripper 4 belonging to the other of these two adjacent stages 30 and 40.

Each gripper 4 has at least one rotational degree of freedom relative to the stage that carries it.

More particularly, in an advantageous configuration, in each stage 10 including at least one gripper 4, at least one gripper 4 has at least two rotational degrees of freedom relative to the stage 10 that carries it. More particularly still, in each stage 10 including at least one gripper 4, each gripper 4 has at least two rotational degrees of freedom relative to the stage 10 that carries it.

In a particular configuration of machining centre 100, at least first stage 30 and second stage 40 are each movable relative to fixed base 60.

This configuration reduces the no-load return at the end of the cycle, imposed by the various technical harnesses, as explained above, and in particular if these two stages move in opposite directions from one another.

Naturally, the simplified explanation given here with only two stages, a first stage 30 and second stage 40, can be extrapolated to a higher number of stages. It is possible, for example, to imagine an intermediate stage having only grippers 4, inserted between two stages having machining units 3, designed to machine both sides of the workpieces carried by the intermediate stage grippers. The only real limitations are those due to the supply of technical fluids, and to the supply of specific machining means, in particular tools and lubricants.

According to the invention, and advantageously, in particular for finish machining, at least one station 50 includes both at least one machining unit 3 and at least one gripper 4. And preferably, at least one station of an adjacent and opposing stage also includes at least one machining unit 3 and at least one gripper 4, which allows a rough workpiece to be unloaded, for finish machining of the area by which it was held in its initial gripper.

More particularly, in at least one stage 10, the position of at least one machining unit 3 is movable relative to the stage 10 that carries it. More particularly, in at least one stage 10, the position of each machining unit 3 is movable relative to the stage 10 that carries it. More particularly, in every stage 10 including at least one machining unit 3, the position of each machining unit 3 is movable relative to the stage 10 that carries it.

More particularly, in at least one stage 10, the position of at least one gripper 4 is movable relative to the stage 10 that carries it. More particularly still, in at least one stage 10, the position of each gripper 4 is movable relative to the stage 10 that carries it. More particularly, still in every stage 10 including at least one gripper 4, the position of each gripper 4 is movable relative to the stage 10 that carries it.

In particular, at least one station 50 includes several machining units 3, whose strokes overlap, and control means 90 are arranged to control each said unit to prevent any collision with the other units and the tools carried thereby. One of these units 3 can thus continue a machining operation started by another unit 3 of the same station 50 during a tool change, or tool measuring, or dressing, or other cycle, of the machining unit 3 that started the machining work; and the latter can resume the machining work while the second unit in turn enjoys technical assistance. Thus, machining on the workpiece being machined is not, or is barely interrupted while the gripper carrying the workpiece is present opposite this station 50 which carries several machining units 3.

In a variant, in such a station 50 comprising several machining units 3 whose strokes overlap, certain of these machining units 3 are independent of each other, and, more particularly, have distinct guide members.

In another variant, in such a station 50 including several machining units 3 whose strokes overlap, several machining units 3 use the same guide members.

Machining centre 100 advantageously includes, among or in addition to machining locations 2, at least one automation station 6 for loading or unloading components to be machined or machined components. More particularly, at least one automation station 6 forms all or part of one of stages 10. More particularly still, at least one such automation station 6 is a part or all of a stage 10 movable relative to fixed base 60.

Returning to the stages 10 which are movable relative to fixed base 60, the Figures illustrate the stages as all coaxial and rotatable, substantially around the same vertical axis, relative to fixed base 60, this particular case does not preclude other configurations where at least one of the stages is rotated about a horizontal axis (which tool magazines of horizontal machining centres often are), this may be the configuration of the machining accessories: supply of workpieces, tools, workpiece measurement, tool measurement, dressing, and others. Machining centre 100 may also have a complex 'Rubik's cube' type structure, with crossed rotational movements.

In a particular embodiment, control means 90 are arranged to control stations 50 such that each machining unit 3 and/or gripper 4 passes in succession before a fixed point in proximity to a fixed base 60 of machining centre 100, which may be the fixed base carrying stages 10, or another laterally disposed base in order to free space around the work areas to allow monitoring by an operator.

More particularly, when grinding operations are to be performed, machining centre 100 includes at least one dressing station 8, which is arranged to perform, in concurrent operation time, the dressing of grinding wheels or tools carried by one of machining units 3. More particularly, dressing station 8 is distinct from machining units 3.

In a particular variant, machining centre 100 includes at least one diamond tool machining station, which is arranged for diamond polishing a workpiece held in a gripper 4.

Advantageously, machining centre 100 includes at least one tool changing station 9, which is arranged to change, in concurrent operation time, grinding wheels or tools carried by one of machining units 3. More particularly, tool changing station 9 is distinct from machining units 3. Tool changing station 9 is advantageously arranged to cooperate with a tool magazine 80 comprised in machining centre 100 and which may form one of stages 10. More particularly, tool changing station 9 is a movable stage 10 relative to fixed base 60.

In a particular configuration, at least one machining unit 3 includes at least one fixed tool 341, and is arranged to cooperate with at least one gripper 4 of a stage adjacent thereto, which gripper 4 is movable in at least one degree of freedom with respect to the station 50 that carries it; it is thus possible to perform turning, boring, journaling or similar operations.

Advantageously, at least one gripper 4 includes at least one spindle 401 for driving a component to be machined at its machining speed.

Figure 1:
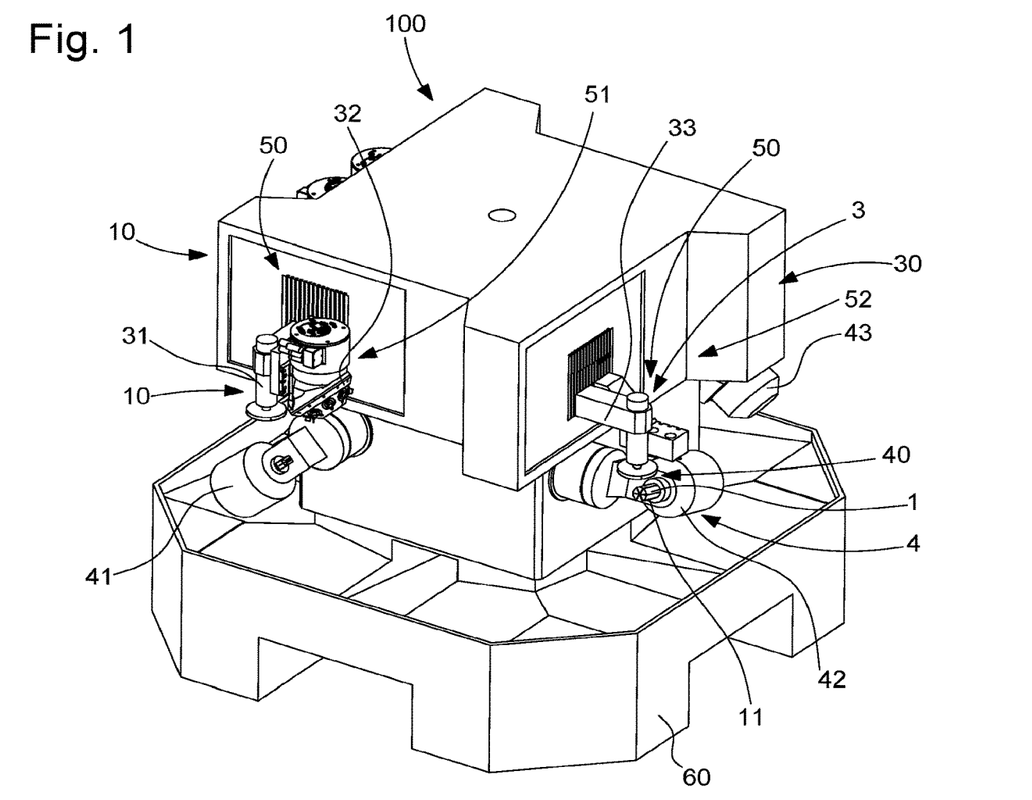
Figure 2:
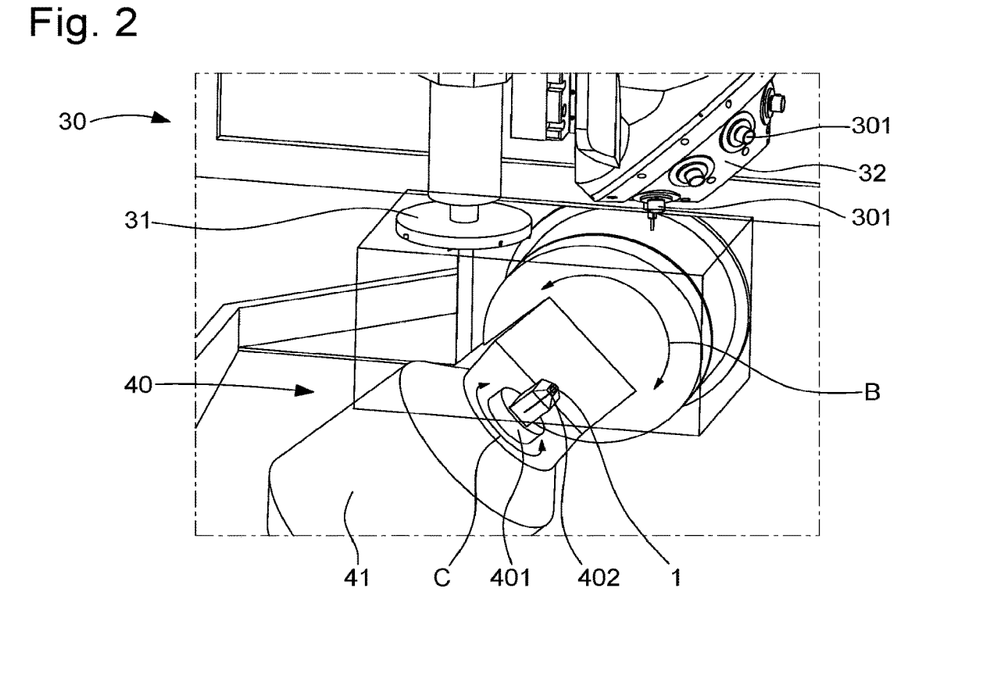
FIG. 2 represents, in a similar manner to FIG. 1 and at the same moment as FIG. 1, a detail of the first machining location where this first upper station, which includes a vertical-axis dressing disc, and an oblique tool turret, and a first lower station, with a double rotary gripper combining an axis B and an axis C which intersect substantially at the area to be machined; the rectangular prism represents the machinable volume.
Figure 3:
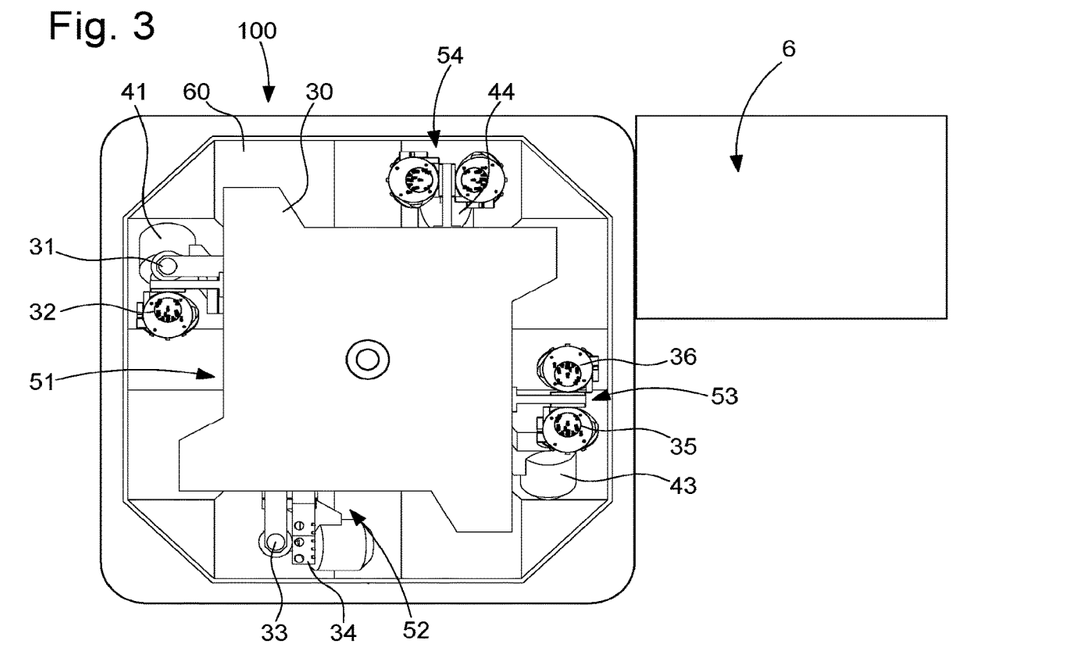
Figure 4:
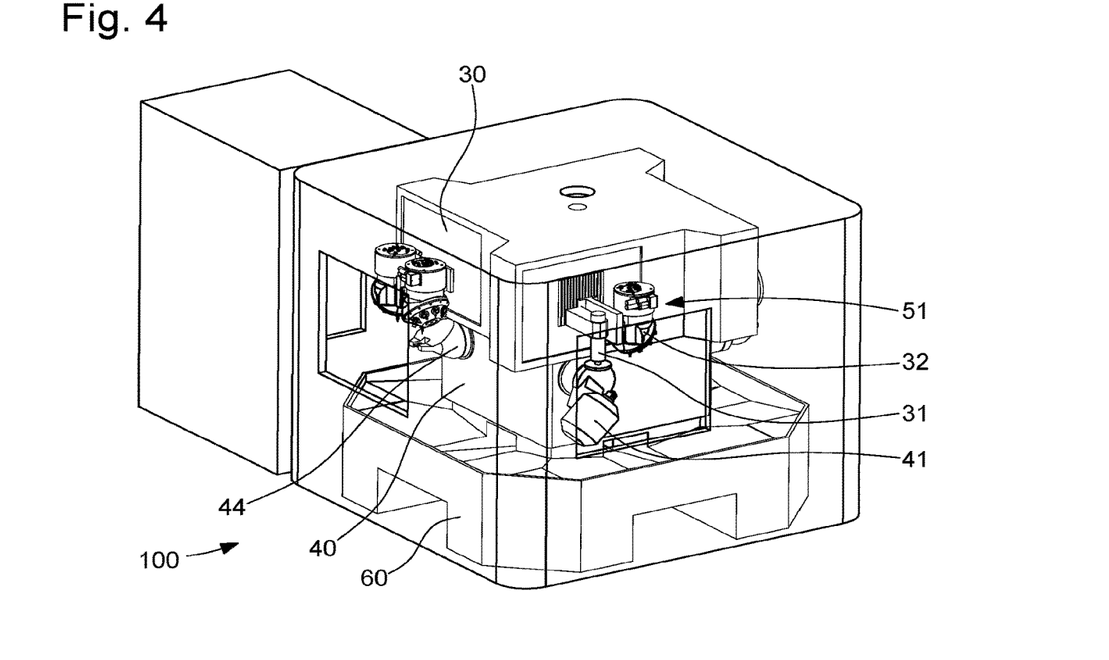
FIG. 4 shows, in a similar manner to FIG. 1 and at the same moment as FIG. 1, another view in which the first location, the fourth location and the external feed area are visible.
Figure 5:
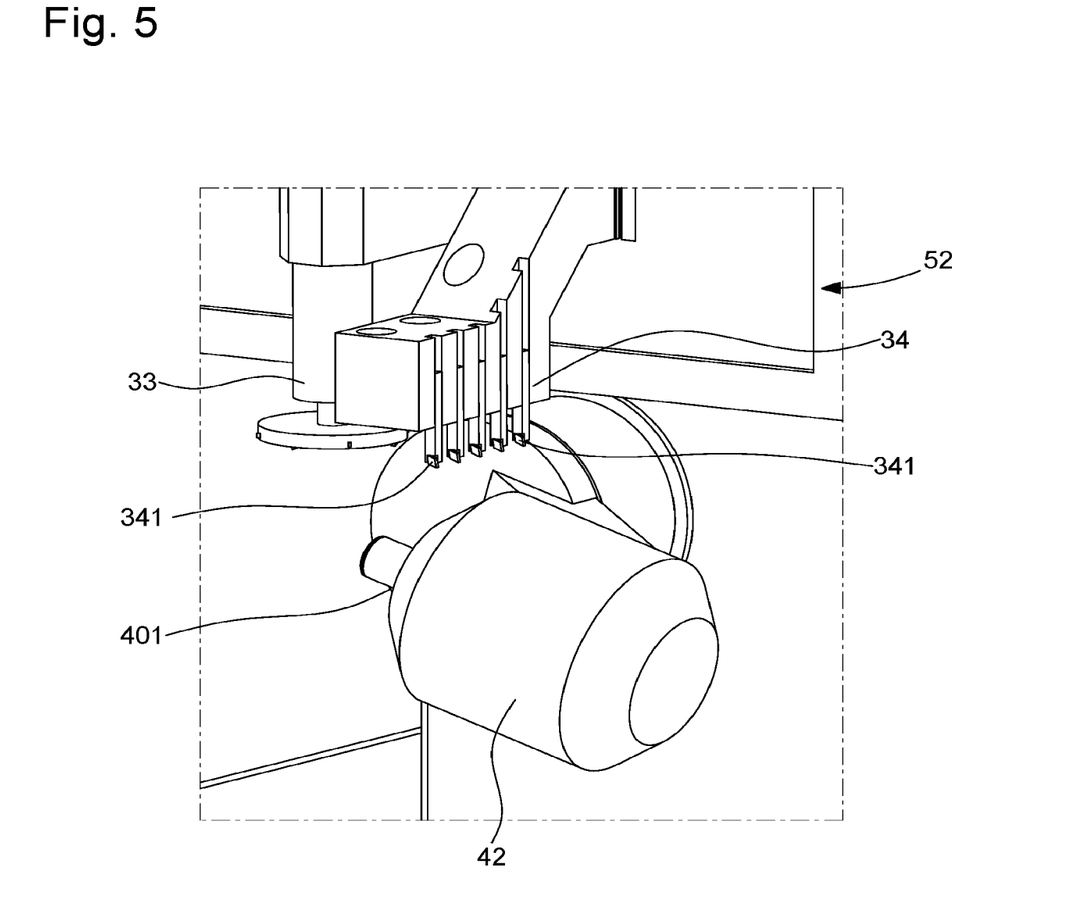
FIG. 5 illustrates, in a similar manner to FIG. 2 and at the same moment as FIG. 2, the second machining location, which includes two machining units in the second upper station: a grinding wheel and a fixed support including turning tools, arranged to turn the workpiece clamped in a spindle carried by the gripper of the lower stage, which is of the double rotary type.
Figure 6:
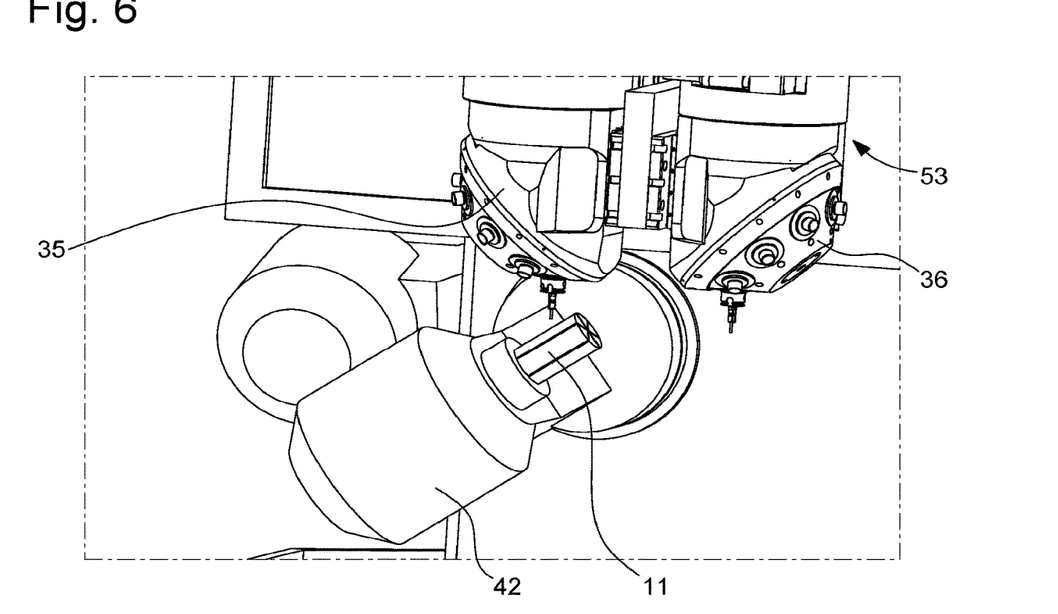
FIG. 6 illustrates, in similar manner to FIG. 2 but at a different moment subsequent to that of FIG. 1, a third machining location, which includes two machining units in the third upper station, each formed by a tool turret, which cooperates with a double rotary gripper.
Figure 7:
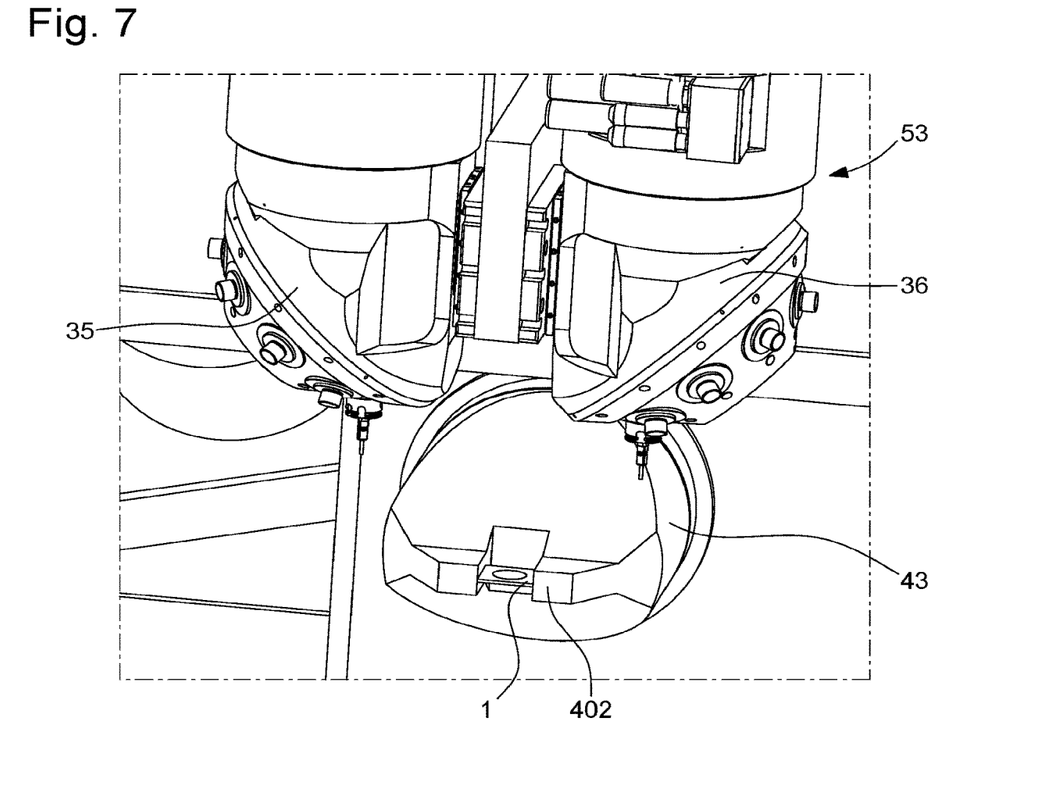
FIG. 7 is similar to FIG. 6, and shows a third machining location at the same moment as FIG. 1, and in a different configuration from FIG. 6, in which the two same machining units in the third upper station cooperate with another lower gripper which is rotary and includes a jaw clamp carrying the workpiece to be machined, which can thus be machined on both sides or on an edge.
Figure 8:
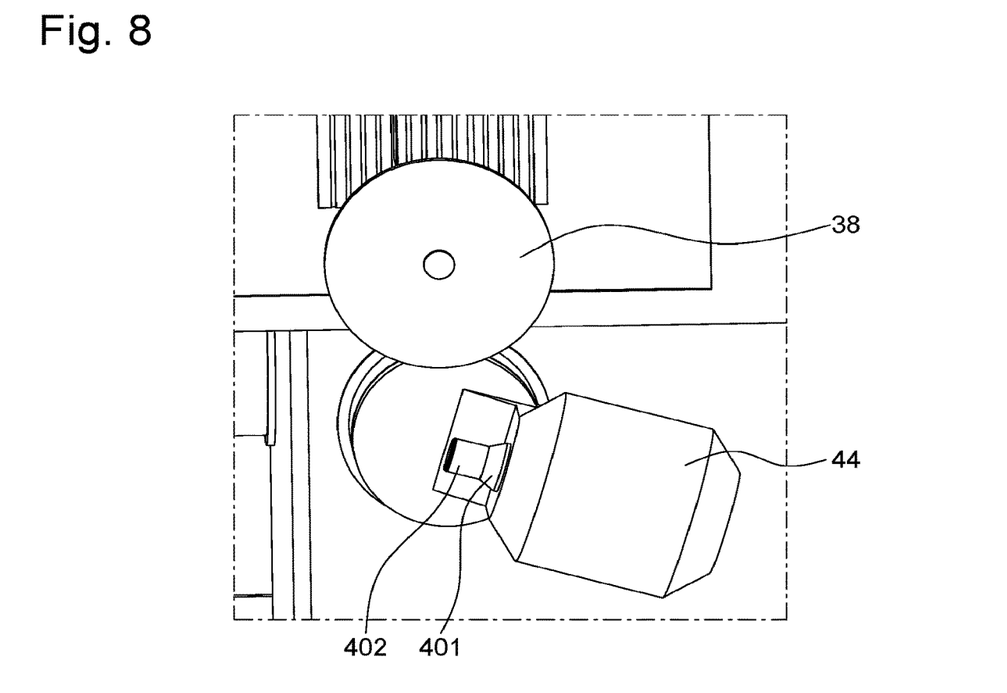
FIG. 8 illustrates, in a similar manner to FIG. 2, a different machining centre from that of the preceding Figures, or at least having different equipment in one of its upper stations, with a horizontal-axis grinding wheel, arranged to cooperate with a rotary gripper of the lower stage.
Figure 9:
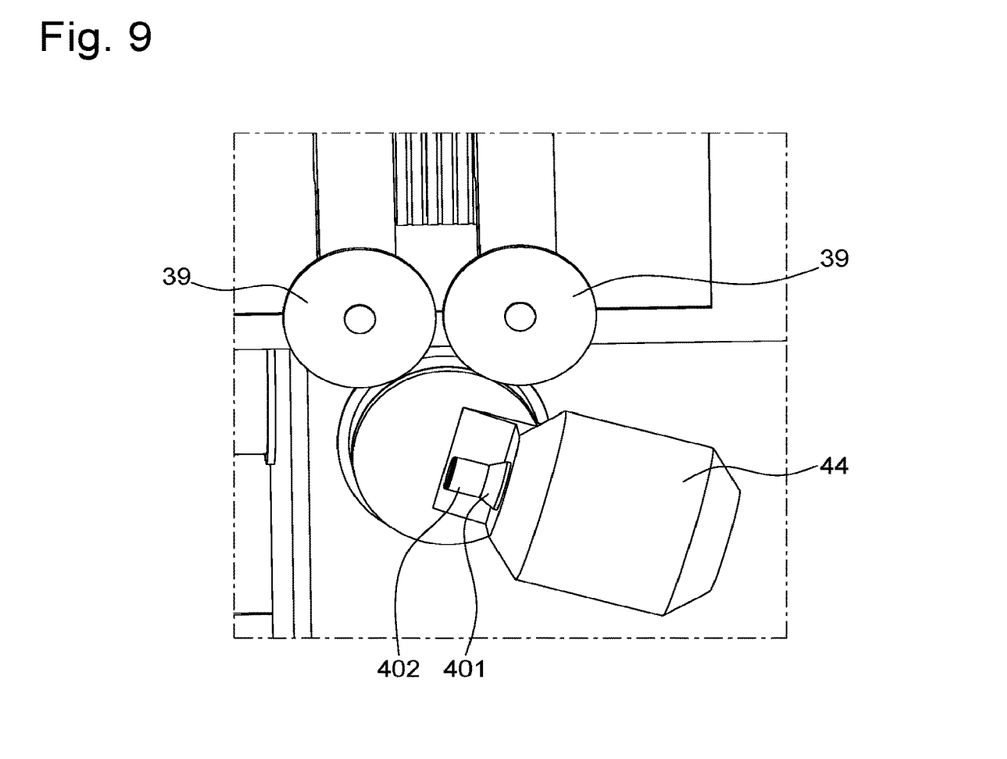
FIG. 9 illustrates a variant of FIG. 8, with one upper station including two horizontal-axis grinding wheels, each arranged to cooperate with one double rotary gripper of the lower stage.
Figures 10, 11, 12:
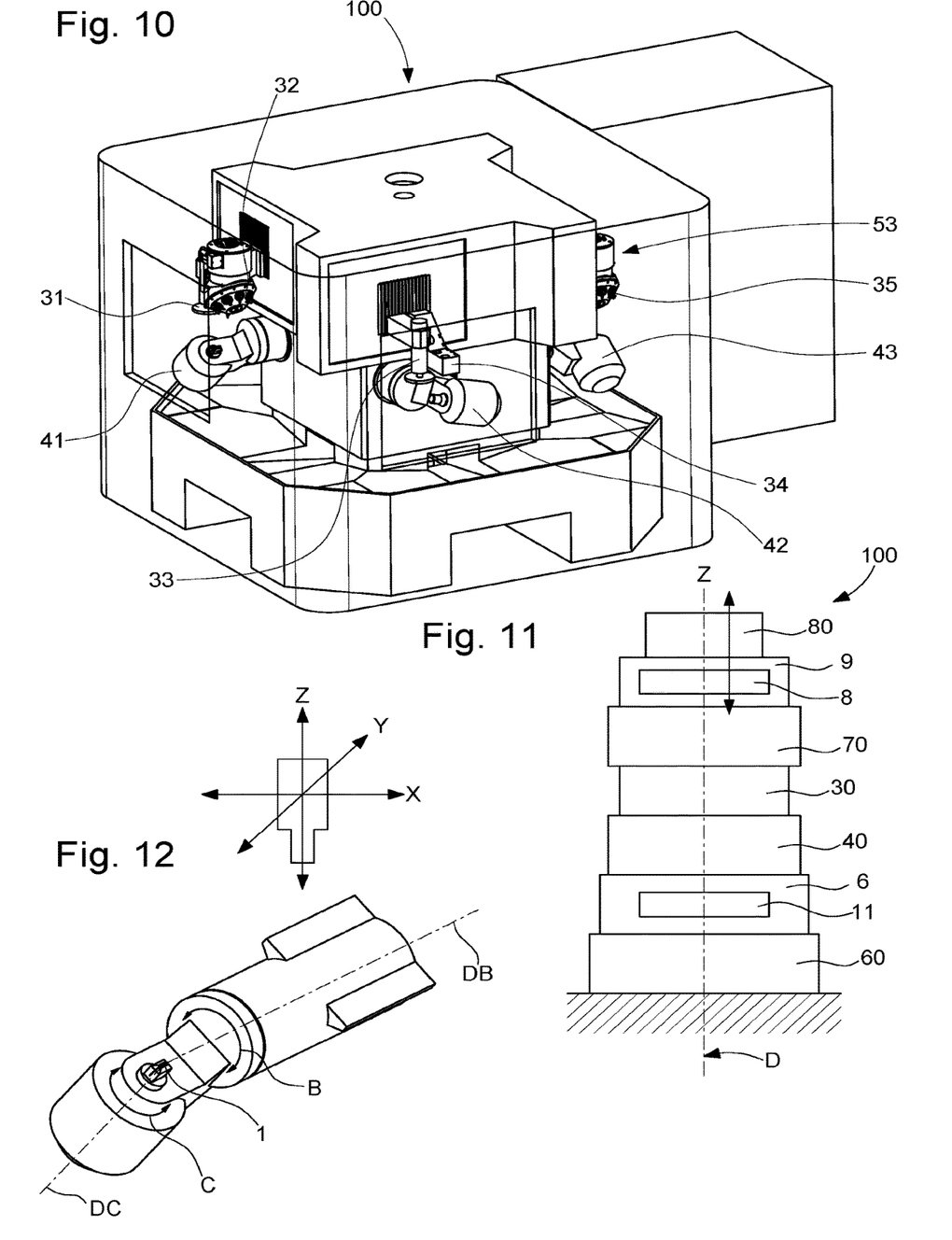
FIG. 10 is a similar view to FIG. 1 but rotated through a quarter-turn.
FIG. 11 is a side view diagram illustrating a machining centre whose various functions are performed on different levels, placed one above the other, substantially coaxially: from the bottom upwards, the fixed base forming the machine frame, then an automation station for checking and/or exchanging workpieces, then a second lower stage, then a first upper stage, then a third upper stage of the same type as the second lower stage, then a tool checker and/or changer and/or grinding wheel dressing station, then a tool magazine.
FIG. 12 is a diagram illustrating the relative arrangement of five work axes in space.
Figure 13:
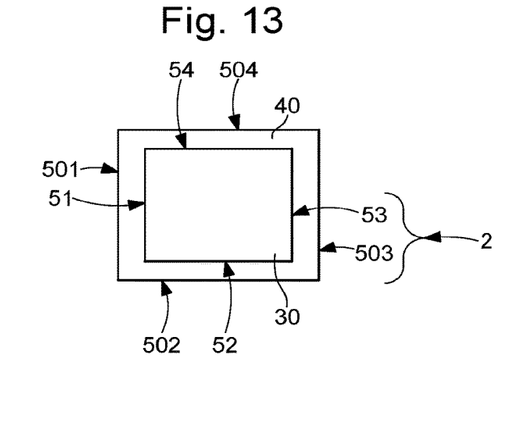
FIGS. 13 to 16 illustrate, step by step, the change of cooperation between the lower stage stations which are movable, with the upper stage stations which are stationary.
Figure 14:
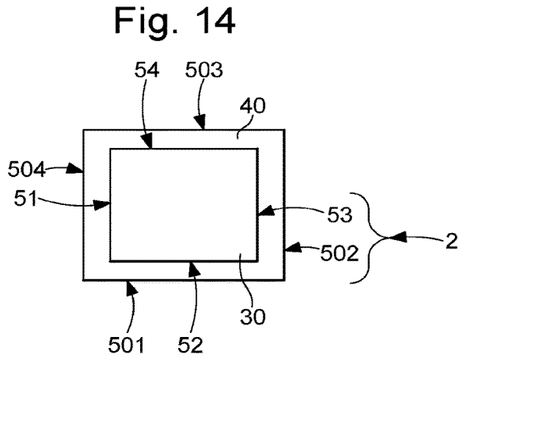
Figure 15:
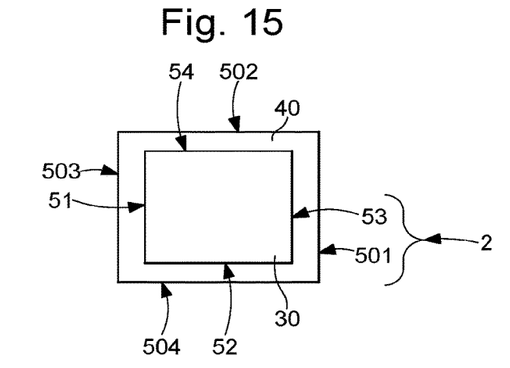
Figure 16:
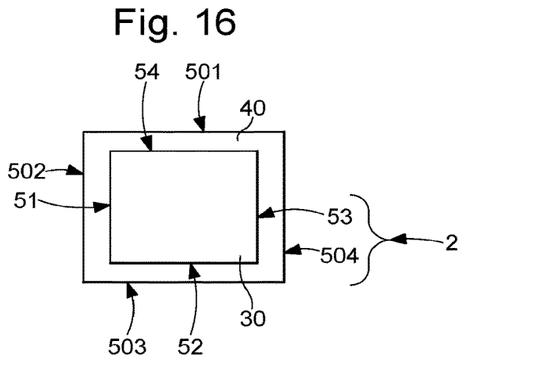
Figure 17:
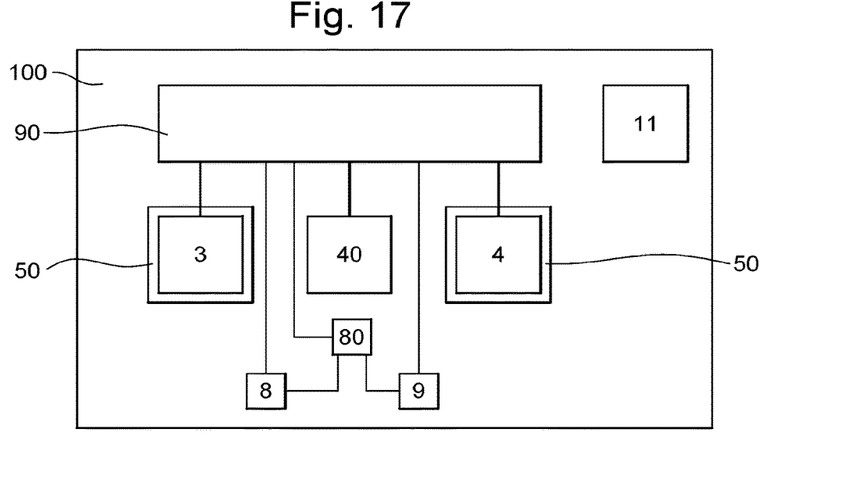
FIG. 17 is a block diagram representing certain functional elements of the machining centre.

More particularly, at least one gripper 4 includes at least one clamp 402 for clamping a component for machining, to allow the machining or double sided machining thereof when the clamp has jaws as in FIG. 8.

More particularly, at least one machining unit 3 includes a plurality of spindles 301 capable of machining the same component attached to a gripper 4 to minimize tool change time.

Advantageously, machining centre 100 includes, in addition to machining locations 2, at least one checking station 11 for checking the geometry of the machined components and/or of the tools used. More particularly, this checking station 11 forms one of stages 10. More particularly still, this checking station 11 is a movable stage 10 relative to fixed base 60.

Control means 90 are preferably arranged to correct the tool paths and/or dynamic tool correctors, and/or to manage tool replacements, or to stop the machining cycle, according to information from checking station 11.

Machining centre 100 includes at least one lubrication and filtering unit capable of filtering the residues from at least one type of machining, particularly grinding, diamond polishing and satin finishing. In the case where operations of different types are to be performed, the lubrication and filtering circuits can be separated, depending on the lubricants to be used, into distinct geometric areas: one circuit for cutting tool machining, another circuit for abrasive machining.

More particularly, stages 10 which are movable relative to fixed base 60 are movable in coaxial rotation about a single axis. More particularly, this single axis is vertical.

The Figures illustrate a particular non-limiting variant, including four machining locations, each combining two areas 50, of a first static upper stage 30 and a second dynamic lower stage 40.

In a particular variant, machining centre 100 includes four locations: three reserved for machining, and a fourth machining location designed for machining and/or automation. The number of operational machining locations depends on the basic cycle time, the overall cycle time breakdown, and the workpiece handling time.

In the illustrated variant, each work location combines:
three translational degrees of freedom, on the X-Y-Z axes, more particularly at machining units 3;
at least one rotational degree of freedom, notably axis C, or axis B, or two rotational degrees of freedom, on axes C and B; more particularly the rotational degrees of freedom are at gripper 4.

Naturally, in addition to this minimal configuration, a machining unit 3 can have one or more rotational degrees of freedom, and a gripper 4 can also have one or more translational degrees of freedom. Some of these additional degrees of freedom, especially in translation, can be semi-axes, to perform palletization in abutment on end positions without stopping on intermediate positions, or rotation of a plate between indexed positions without stopping on intermediate positions.

In the illustrated transfer machine, the entire second stage 40 comprising the dividers is indexed from station to station.

Due to the flexible connections, the rotation of each movable stage is necessarily angularly limited. In practical terms, this angular limitation is set at a reasonable value, notably 360°, and, every 360°, after completion of a cycle, the machine must rewind in one turn to return to a starting configuration of a new cycle.

This distribution of axes allows for a rigid construction with very short force loops This compactness allows for short force loops and makes it possible to have stiff structural parts, together with easy-to-protect kinematics.

The chosen configuration offers various tool possibilities, and, in particular, in addition to the most common configurations:

a station with a dressing disc and with a tool turret, suitable in particular for conventional high speed machining;

a station with a turning comb with fixed bits, high-frequency spindle locations, and a dressing disc.

Generally, using a grooved table allows for equipment with various types of tools or combinations of tools, provided there are no collisions during machining.

The possibility of equipping the machine with different tools/spindles/bits on a medium-sized transfer machine makes the concept interesting for various horological applications.

The use of an even number of support stands (notably four) allows for a machining concept wherein the six sides of the workpiece are worked on (for example twice on a first support stand on face A, twice on a second support stand on face B), by making two passes through the machine.

The machine also allows an application for machining ébauches for timepieces, with the possibility of turning the workpiece using the axis C to machine both sides in a single clamping position, and for machining edges, and with the possibility of changing tools concurrently using the double spindle principle.

The application to grinding may also implement a single grinding wheel, for example 300 mm in diameter, or with several smaller grinding wheels, for example two grinding wheels 200 mm in diameter.

The illustrated machining centre has many advantages as regards the process:

5-axis CNC machining, and more particularly 5 continuous axes. Preferably, the two rotations are centred in the workpiece centre: there are therefore few compensation movements to be made;

novel possibilities are offered for machining and in particular for machining decorations, especially of the engine-turning type or the like, made possible by the 5-axis machining and tool change, easily achievable even for a multi-tool turret;

a large number of tools can be used, and a great variety of operations are possible because of the three, or even four machining stations.

Other advantages concern the operation and use of the machine:

ease of recovery of raw materials, fallen chips;

ease of access for the user/machine setter, ease of adjustment.

The more the time spent at each of the stations is balanced, the better the advantages in terms of productivity because of the three machining stations and the loading/unloading station.

Other advantages concern the design of the tools, facilitated by standardizing X-Z tables, with an array of threads or and/or an array of T-shaped slots, to provide great modularity for the tools The machine is still sufficiently versatile to allow other types of machining processes than those for which the machine is designed.

Machining centre 100 according to the invention is more particularly designed for work from a rough piece or for finish machining. However, at least one stage 10 carrying machining units 3 can be provided with a bar feeder or a mini bar feeder, whose length is close to that of the spindle, in one of these machining units 3, which assumes that the corresponding machining unit 3 is fixed. Preferably, there is only one such bar feeder, since, although it is theoretically possible to then set up several machining units 3 with such a bar feeder, the footprint of the machine is then greatly increased, which reduces one of the advantages of this machine, which is its compactness. More particularly, this bar feeder is fixed to base 60.

The advantage of a machining centre as illustrated and described is the complete machining of finished components, without further machining.

In a particular implementation, this machining is achieved in a single clamping position, with work on only five sides.

In another implementation variant, this machining includes turning the workpiece over and changing the clamping position to machine the whole of this component, on all sides.

The machining centre according to the invention allows very short operating times. Consequently the cycle for feeding rough parts to be machined and unloading machined components is far from negligible in view of the machining time at each of work locations 2, and in view of the complete cycle time, and this loading/unloading duration may, in some cases, be the lead time of the entire cycle. The various basic cycle times can be estimated in a range of approximately 10 to 15 seconds, which is an incentive to increase the number of components on each gripper, and/or to make the same machining unit 3 cooperate with two distinct grippers 4, for example in two distinct stages, located on either side of the stage comprising this machining unit—one lower and one higher.

In short, the originality of this machine lies in the combination of:

the number of work locations, which is relatively reduced, four in the example illustrated by the Figures;

the arrangement of the machine axes, with advantageous kinematics because of the proximity of the machining units and the grippers, which drastically reduces no-load runs;

the versatility for realizing very different timepiece applications simply by changing tools: diamond polishing, turning/milling, grinding and others.

The invention makes it possible to increase efficiency in different horological applications, while standardizing production equipment. Moreover, through its relatively small number of work locations, this machine is better suited to current production batches in the watch industry than to the large batches of the past.

The invention claimed is:

1. A machining center for machining timepiece components, the machining center comprising:

a fixed base on which are coaxially superposed a plurality of stages which are superposed and adjacent to one another such that a virtual straight line extending out from the fixed base intersects each of the plurality of stages, wherein the plurality of stages comprises a first stage, a second stage, and a third stage, wherein said first stage and said second stage each include, on the periphery thereof, respective distinct stations arranged at a constant angular pitch around an axis of said first stage and said second stage, each of said respective distinct stations of the first stage including a machining unit that machines the timepiece components and whose movements are controlled by a control, and each of said respective distinct stations of the second stage including a gripper that holds the timepiece components one at a time and whose movements are controlled by the control, and wherein at least the first stage is rotatable about the axis such that said first stage is able to be position indexed with respect to the fixed base, wherein machining locations of the machining center are each formed by a combination of one of said stations from said first stage and one of said stations from said second stage, and each of said machining locations combines a given machining unit of said first stage and a given gripper of said second stage, wherein each relative movement between two indexing positions of said first stage and said second stage is able to change a composition of each of said machining locations, and wherein each gripper of the second stage has at least one rotational degree of freedom relative to the second stage that carries each gripper, and wherein the third stage is formed by an automation station for loading in the grippers components of the timepiece components to be machined and for unloading from the grippers components of the timepiece components that were machined.

2. The machining center according to claim 1, wherein, each gripper of the second stage has at least two rotational degrees of freedom relative to said second stage that carries each gripper.

3. The machining center according to claim 1, wherein each of the relative movements between two indexing positions of the first stage and the second stage is able to change the composition of each of said machining locations to obtain at least two distinct compositions of said machining locations.

4. The machining center according to claim 1, wherein at least said first stage and said second stage are each indexable relative to said fixed base.

5. The machining center according to claim 1, wherein, in the first stage, the position of at least one machining unit that is carried thereon is movable relative to the first stage.

6. The machining center according to claim 5, wherein, in the first stage, the position of each machining unit that is carried thereon is movable relative to the first stage.

7. The machining center according to claim 1, wherein, in the second stage, the position of at least one gripper that is carried thereon is movable relative to the second stage.

8. The machining center according to claim 1, wherein, in the second stage, the position of each said gripper that is carried thereon is movable relative to the second stage.

9. The machining center according to claim 1, wherein each gripper has at least two rotational degrees of freedom relative to the second stage that carries each gripper.

10. The machining center according to claim 1, wherein at least one station of the respective distinct stations of the first stage includes two machining units whose strokes overlap, and said control is configured to control each of said two machining units to prevent any collision with other units of said two machining units and tools carried thereby.

11. The machining center according to claim 1, wherein said third stage is movable relative to said fixed base.

12. The machining center according to claim 1, wherein said control is configured to control said first stage and said second stage such that each machining unit and/or each said gripper passes in succession before a fixed point in proximity to the fixed base of said machining center.

13. The machining center according to claim 1, wherein at least one machining unit of the first stage includes at least one fixed tool and is configured to cooperate with at least one gripper of the second stage, and said at least one gripper is movable in at least one degree of freedom relative to the station that carries said at least one gripper.

14. The machining center according to claim 1, wherein at least one gripper includes at least one spindle that is configured to drive a given timepiece component to be machined at a machining speed.

15. The machining center according to claim 1, wherein at least one gripper includes at least one clamp configured to clamp a given timepiece component to be machined of the timepiece components to allow machining of both sides of said given timepiece component.

16. The machining center according to claim 1, wherein at least one machining unit includes a plurality of spindles that are configured to machine a same component of the timepiece components attached to a given gripper of the second stage while minimizing a tool change time.

17. The machining center according to claim 1, wherein said control is configured to correct tool paths and/or dynamic tool correctors.

18. The machining center according to claim 1, wherein the first stage and the second stage are movable relative to said fixed base, and the first stage and the second stage are movable in coaxial rotation about a single axis.

19. The machining center according to claim 18, wherein said single axis is a vertically extending axis.

20. The machining center according to claim 1, wherein each station of the respective distinct stations of the first stage extends in a respective first plane, and where each station of the respective distinct stations of the second stage extends in a respect second plane.

21. The machining center according to claim 20, wherein each respective first plane is a respective vertical plane, and where each respective second plane is a respective second plane.

* * * * *